Figure 1:
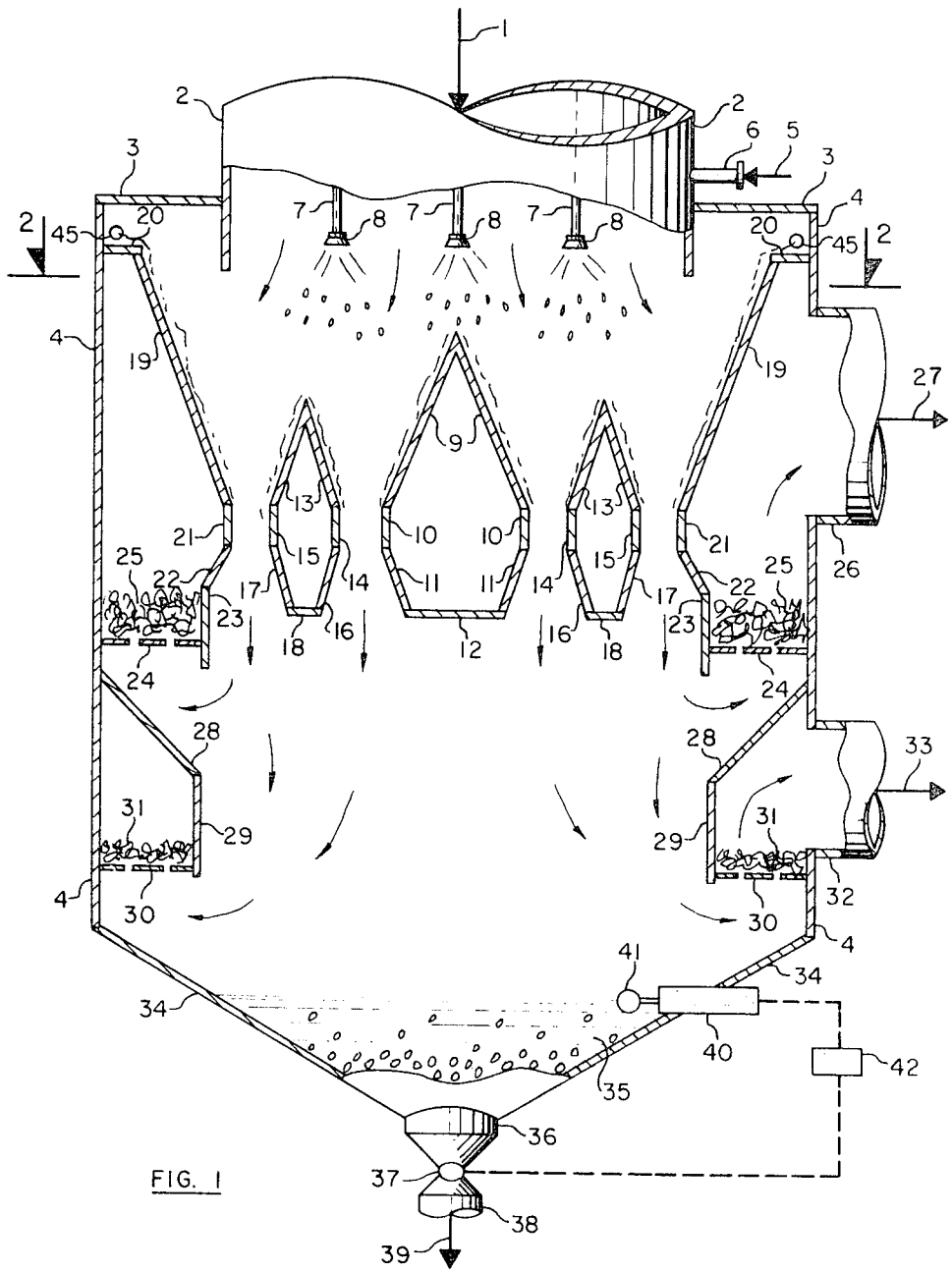

United States Patent

[11] 3,584,440

[72] Inventor Julio S. Vigil
 Middle Village, N.Y.
[21] Appl. No. 808,517
[22] Filed Mar. 19, 1969
[45] Patented June 15, 1971
[73] Assignee Chemical Construction Corporation
 New York, N.Y.

[54] CONCENTRIC ANNULAR VENTURI GAS SCRUBBER
 18 Claims, 2 Drawing Figs.
[52] U.S. Cl. .................................................. 55/219,
 55/227, 55/241, 55/259, 55/463, 261/112,
 261/116
[51] Int. Cl. ............................................... B01d 47/10
[50] Field of Search........................................ 55/240,
 241, 259, 219, 227, 463; 261/115—118, 112

[56] References Cited
 UNITED STATES PATENTS
 3,085,793 4/1963 Pike et al. .................... 261/112

| | | | |
|---|---|---|---|
| 3,317,197 | 5/1967 | Lohner et al. ............. | 261/VS |
| 3,420,508 | 1/1969 | Hurst et al. ................ | 261/116 |
| 3,456,928 | 7/1969 | Selway ....................... | 261/VS |

*Primary Examiner*—Frank W. Lutter
*Assistant Examiner*—Bernard Nozick
*Attorney*—J. L. Chaboty

ABSTRACT: An apparatus is provided for scrubbing an impurity-laden gas stream with a scrubbing liquid such as water to remove impurities from the gas into the liquid phase. The apparatus provides circular concentric or annular venturi passages for the gas-liquid contact, by the provision of a vertical gas scrubbing container in which a central conical baffle, an annular or concentric angular ring-shaped baffle, and an outer inverted frustoconical baffle are coaxially and concentrically disposed, with the apexes of the central baffle and the angular ring-shaped baffle extending upwards, and with the baffles being spaced apart so as to provide two concentric annular venturi-type gas scrubbing passages, so that large volumes of impurity-laden gas may be uniformly scrubbed with low gas pressure drop loss.

JULIO S. VIGIL
INVENTOR.

CONCENTRIC ANNULAR VENTURI GAS SCRUBBER

BACKGROUND OF THE INVENTION

1. Field of the Invention

The invention relates to the scrubbing of impurity-laden gas streams, such as stack or flue gases, waste gases from metallurgical processes or furnaces, off gases from chemical plants or processes, combustion gases from incinerators, or the like, to remove entrained solid particles or liquid droplets, or vaporous or gaseous components or the like impurities or components from the gas stream, prior to further usage of the gas stream or discharge of the scrubbed gas stream to the atmosphere. The scrubbing liquid may consist of water or an aqueous medium or solution, or other suitable scrubbing liquid, and a major application of the present invention relates to the scrubbing of waste gases prior to discharge to the atmosphere, so as to prevent air pollution by removal of objectionable solid, liquid or gaseous impurities from the waste gas stream and thereby render the gas stream relatively innocuous prior to discharge to the atmosphere. Other applications of the present invention will include the scrubbing of process gas streams in chemical and metallurgical processes, so as to remove and/or recover selected impurities or components.

2. Description of the Prior Art

Numerous types of apparatus and devices have been suggested for usage in scrubbing an impurity-laden gas stream with a scrubbing liquid. One important type of apparatus utilized for this purpose operates on the venturi principle, in which the gas stream is accelerated to a high velocity in a passage of venturi configuration, and a scrubbing liquid is injected or projected into the gas stream at the throat of the venturi, which is the region of maximum gas velocity. A typical venturi-type of scrubber is shown in British Pat. No. 911,271. Parallel venturi passage scrubbers are shown in Canadian Pat. Nos. 788,802 and 751,209, U.S. Pat. Nos. 3,347,024; 3,339,344; 3,181,287 and 2,797,904 and application Ser. No. 643,098 filed June 2, 1967 and now U.S. Pat. No. 3,440,803. Annular venturi passage scrubbers are shown in British Pat. No. 1,100,295; Canadian Pat. No. 749,764; U.S. Pat. Nos. 3,317,197; 3,191,364; 3,085,793; 2,869,674; 2,621,754 and application Ser. No. 753,583 filed Aug. 19, 1968 and now issued as U.S. Pat. No. 3,544,086.

SUMMARY OF THE INVENTION

In the present invention, an improved venturi-type apparatus is provided for scrubbing an impurity-laden gas stream with a scrubbing liquid. The apparatus features two concentric circular annular vertical venturi passages for gas-liquid contact, which are provided within a vertically oriented cylindrical container, by concentrically disposing a central conical baffle, an annular ring-shaped circular baffle having an angular projection, and an outer inverted frustoconical baffle within the container. The baffles are concentrically oriented in a horizontal plane and are spaced apart, so as to provide two annular venturi-type passages for gas-liquid contact. A gas inlet conduit extends vertically downwards into the container, and spray means are provided to spray liquid droplets into the gas stream above the baffles. In a preferred embodiment, each annular venturi passage is of the complete venturi configuration including converging section defined by the principal baffles described supra, throat section defined by concentric vertically oriented and opposed cylindrical baffles which depend downwards from the main upper baffles, and diverging section defined by lower dependent frustoconical and inverted frustoconical baffles. An improved structural arrangement is provided for separating entrained liquid droplets from the scrubbed gas stream, and for removing impurity-laden scrubbing liquid from the lower part of the container at a controlled rate, so as to maintain a body of liquid in the lower portion of the container, so that the downflowing liquid droplets impinge on the body of liquid and reentrainment of liquid droplets in the scrubbed gas stream is prevented.

A principal advantage of the present invention is that the apparatus permits and attains the effective scrubbing of relatively large flowing volumes of gas at low gas pressure drop. The conservation of gas pressure is highly important in the scrubbing of waste gas streams which are subsequently discharged to the atmosphere. Another advantage is that the gas stream is effectively, completely and uniformly scrubbed with the scrubbing liquid, with the resultant removal of impurities to very low or negligible residual levels. A further advantage is that the apparatus is relatively simple, the apparatus structural elements are readily fabricated from standard components and materials, and the apparatus combination is readily assembled in practice.

It is an object of the present invention to provide an improved apparatus for the removal of impurities or specific components from gas streams.

Another object is to provide an improved apparatus for scrubbing an impurity-laden gas stream with a scrubbing liquid to remove impurities or desired components.

A further object is to provide an improved apparatus for scrubbing an impurity-laden gas stream with a scrubbing liquid, in which large volumetric flow rates of gas are accommodated with low pressure drop.

An additional object is to provide an apparatus for the substantially complete removal of impurities from a gas stream by contact with a scrubbing liquid.

Still another object is to provide an improved venturi-type apparatus for dispersing droplets of a scrubbing liquid into a gas stream.

These and other objects and advantages of the present invention will be evident from the description which follows.

DESCRIPTION OF THE DRAWINGS AND PREFERRED EMBODIMENTS

Figure 2:
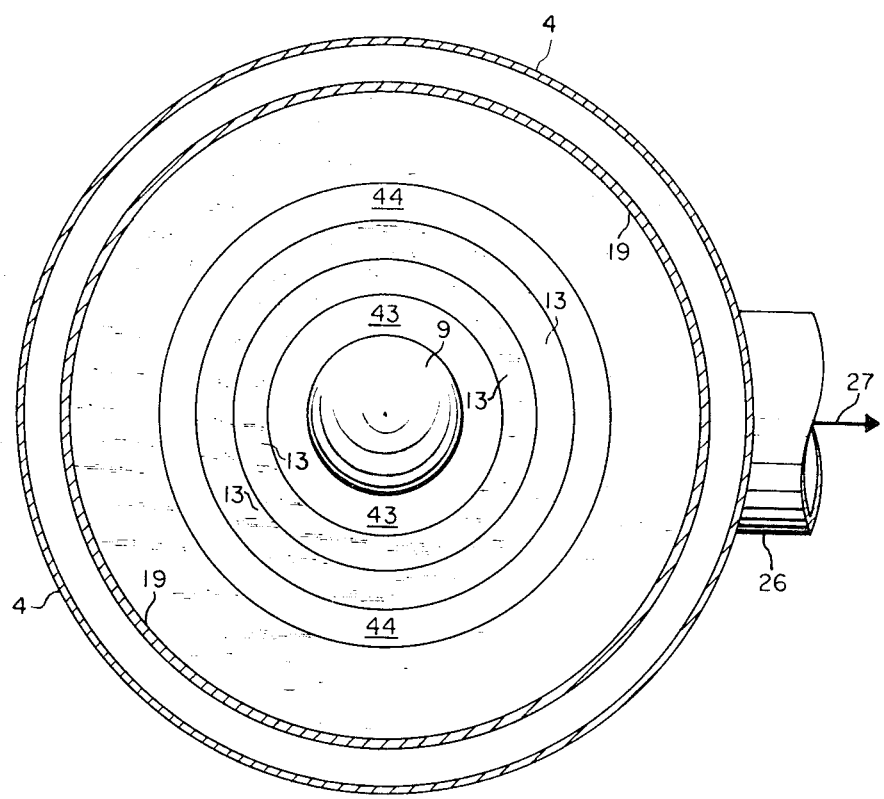

Referring now to the drawings, FIG. 1 is a sectional elevation view of a preferred embodiment of the present invention, and FIG. 2 is a plan view of FIG. 1, taken on section 2-2.

Referring now to FIG. 1, a waste or process gas stream 1, derived from one of the sources mentioned supra and containing an impurity or component to be removed by scrubbing with a liquid, is passed downwards through vertically oriented cylindrical conduit 2. In this embodiment of the invention, stream 1 will be described as a waste flue gas derived from the combustion of a fuel and containing impurity principally consisting of gaseous sulfur dioxide and entrained solid particles of fly ash and soot. Stream 1 is passed downwards through conduit 2 by means of a blower or the like, or by virtue of the elevated pressure head at which stream 1 is discharged from the combustion process. In some cases, the flow of stream 1 will be induced by means of an exhauster acting on the scrubbed gas stream.

Conduit 2 extends downwards through the horizontal top plate 3 of the vertically oriented cylindrical container 4, which is coaxially aligned below conduit 2, with conduit 2 preferably terminating with a lower end section within container 4. A scrubbing liquid stream 5, which in this embodiment of the invention consists of water or an aqueous alkaline solution which concomitantly removes sulfur dioxide and entrained solid particles from the gas stream, is passed via nozzle 6 and pipes 7 to spray nozzles 8, which are preferably disposed in the lower portion of conduit 2 and spray the liquid stream 5 generally outwards and downwards into the gas stream, or cocurrently with gas stream flow. The spray liquid droplets are thus essentially uniformly dispersed into the gas stream in the upper portion of container 4.

A conical baffle 9 is centrally and coaxially disposed in the upper portion of container 4, with the apex of baffle 9 extending upwards and opposed to the downwards flow of the waste gas stream containing entrained disc-shaped droplets, so that the downflowing waste gas stream is diverted into an annular flow pattern by baffle 9, and a portion of the liquid droplets impinge on the outer surface of baffle 9, to provide a downflowing film of liquid on the outer surface of the baffle 9. A vertically oriented cylindrical baffle 10 is preferably coaxially disposed within container 4 and depends downward from the lower end or perimeter of baffle 9. An inverted frustoconical baffle 11 is preferably coaxially disposed within container 4 and depends downward from the lower end or perimeter of baffle 10. A flat disc-shaped or circular horizontal baffle 12 extends across the lower perimeter of baffle 11, to provide a closed central space defined by the baffles 9, 10, 11 and 12 which may be filled with suitable solid material or structural support members in practice.

An annular generally ring-shaped or circular baffle 13 having an upper angular projection is concentrically and coaxially disposed about the outer perimeter of baffle 9 and spaced from baffle 9, with the lower base of baffle 13 being generally disposed adjacent to or in the same horizontal plane as the base of baffle 9, and with the upper apex of baffle 13 preferably terminating in a horizontal plane which is at a lower vertical elevation than the upper apex of baffle 9. In an alternative embodiment of the invention, the vertical elevation of the upper apex of baffle 13 may be at or above the vertical elevation of the apex of baffle 9. An inner vertically oriented cylindrical baffle 14 depends downwards from the lower inner perimeter of baffle 13, and baffle 14 is coaxially and concentrically disposed within container 4 and spaced opposite to baffle 10. An outer vertically oriented cylindrical baffle 15 depends downwards from the lower outer perimeter of baffle 13, and baffle 15 is coaxially and concentrically disposed within container 4 and spaced opposite to baffle 14. A concentric and coaxial frustoconical baffle 16 depends downwards within container 4 from the lower perimeter of baffle 14, and an outer concentric and coaxial inverted frustoconical baffle 17 depends downwards within container 4 from the lower perimeter of baffle 15 and opposite to baffle 16. The circular lower ends of baffles 16 and 17 are joined by the coaxial flat horizontal ring-shaped and generally circular baffle 18. The annular space defined within the baffles 13, 14, 15, 16, 17 and 18 may be filled with solid material or structural support members in practice.

An annular inverted frustoconical baffle 19 is coaxially disposed within container 4, and baffle 19 is concentrically disposed external to and spaced from baffle 13, with the lower base of baffle 19 being disposed adjacent to or in the same horizontal plane as the base of baffle 13. The upper end of baffle 19 is preferably attached to container 4 by the fluid-impervious annular connecting baffle 20, which may alternatively extend to element 3 or the lower end of conduit 2. In another alternative embodiment of the invention, the upper end of baffle 19 may be directly attached or connected to container 4 or element 3 by a fluid-impervious connection, in which case baffle 20 may be omitted. A vertically oriented cylindrical baffle 21 preferably depends downwards from the lower end of baffle 19, and baffle 21 is coaxially disposed within container 4 and concentrically oriented external to and spaced opposite to baffle 15. A frustoconical baffle 22 depends downwards and outwards from the lower end of baffle 21, and baffle 22 is preferably concentrically disposed external to and spaced opposite to baffle 17. A vertically oriented cylindrical baffle 23 is preferably coaxially disposed within container 4, and baffle 23 depends downwards from the lower perimeter of baffle 22.

In operation of the concentric annular venturi gas scrubbing passages section of the device, as defined by the baffles described supra, spray liquid droplets impinge on the upper surface of baffle 9, as mentioned supra, so that a thin liquid film flows downwards on the outer or upper surface of baffle 9. Similar liquid films are formed and flow downwards on the upper surfaces of baffle 13 and the inner surface of baffle 19. The liquid films are projected into the accelerated high velocity gas stream portions flowing downwards through the first annular venturi passage throat section defined by baffles 10 and 14, and the second annular venturi passage throat section defined by baffles 15 and 21, so that concentrated and effective gas stream scrubbing takes place in the two annular venturi gas flow passages principally defined by baffles 9, 13 and 19, and the ancillary baffles as described supra.

The mixture of scrubbed gas, and liquid droplets containing entrained or dissolved impurity derived from the gas, flows downwards through the coaxially disposed vertically oriented cylindrical baffle or conduit 23 within container 4. Most of the liquid droplets continue to flow downwards to the lower end or bottom of container 4, while a portion of the scrubbed gas containing residual mist or entrained liquid droplets flows outwards below the lower end of element 23, and upwards through support grate or grid 24, with the liquid particles being removed as the gas stream flows upwards through wire mesh filter 25, which is supported on grid 24. The separated liquid droplets coalesce within element 25 and flow downwards within container 4, while the gas stream portion flowing annularly upwards from element 25 is now substantially free of entrained liquid droplets, and this gas stream portion is removed from container 4 via conduit 26 as stream 27, which may now be safely discharged to atmosphere or employed for any suitable purpose. In some cases, conduit 26 will extend to a suitable exhauster or blower, which induces gas stream flow through the device.

An annular inverted frustoconical baffle 28 extends downwards within container 4 below grid 24, from an upper fluid-impervious attachment to container 4. A vertically oriented cylindrical conduit or baffle 29 is coaxially disposed within container 4, and baffle 29 depends downwards from the lower end of baffle 28. The remaining portion of the scrubbed gas stream containing mist or entrained liquid droplets flows downwards within container 4 and through the vertical passage defined by baffles 28 and 29, and thereafter flows outwards below the lower end of baffle 29. The gas portion next flows upwards through annular support grid 30 and annular entrainment separator wire mesh 31, in which the entrained liquid phase is separated from the gas stream portion in a manner similar to the operation of wire mesh element 25 described supra. The resulting scrubbed gas phase discharged above the annular wire mesh element 31 is removed from container 4 via conduit 32 as stream 33, which is processed in a manner similar to stream 27. In some cases, streams 33 and 27 may be combined prior to further processing.

Returning to the lower portion of container 4, the scrubbing liquid phase containing impurity removed from the gas stream, which in the present embodiment of the invention includes entrained solid particles of soot and fly ash, is collected in the lower portion of container 4 defined by the inverted conical bottom section 34 as liquid pool or body 35 containing solid particles. Portions of liquid body or slurry 35 are withdrawn at the lower apex of element 34 via the vertically oriented conduit 36, which extends downwards from a bottom opening at the apex of section 34 to control valve 37. The slurry or liquid stream containing entrained solid particles is passed through valve 37 at a controlled rate and flows downwards through conduit 38 as stream 39, which may be clarified by settling and/or filtration and recycled via stream 5. In other cases, stream 39 will be passed to waste disposal.

The liquid level of pool 35 in bottom section 34 of container 4 is sensed and measured by sensing element 40 which is usually provided with float element 41 within container 4. A signal proportional to liquid level or change in liquid level is pneumatically or electrically transmitted from element 40 to controller 42, which in turn adjusts control valve 37 to maintain the level of liquid substantially constant by controlling the liquid withdrawal rate.

In some cases elements 40, 41 and 42 may be omitted, in which case element 37 may be a liquid drain valve disposed to permit all of the liquid to flow out of the bottom of container 4 while preventing gas flow. This alternative may be practiced in some instances of relatively low gas velocity, however in most cases a body of liquid will be provided in the bottom of unit 4 to restrain and entrain downflowing liquid droplets by liquid-liquid impingement, since when the bottom of unit 4 is free of a liquid body the droplets will impinge on solid metal surfaces, with the possibility of reentrainment in the gas phase due to gas turbulence, shattering of the liquid droplets, and the like.

Referring now to FIG. 2, the concentric and coaxial arrangement of the baffles 9, 13 and 19 within container 4 is illustrated, as well as the two concentric annular venturi passages, the inner passage 43 being defined between the conical central baffle 9 and the inner surface of baffle 13, and the outer passage 44 being defined between the outer surface of baffle 13 and baffle 19.

Numerous alternatives within the scope of the present invention, besides those mentioned supra, will occur to those skilled in the art. Conduit 2 may terminate at the level of top plate 3. The spray nozzles 8 may be disposed in any suitable pattern, and may be located within conduit 2 above the level of plate 3, or below the lower end of conduit 2 and entirely within container 4. A plurality of spray nozzles will generally be provided in practice, and more or less than three nozzles may be employed in suitable instances. The ancillary throat-defining baffles 10, 14, 15 and 21 may be omitted in some instances, in which case the respective frustoconical and inverted frustoconical baffles 11, 16, 17 and 22 would depend directly and respectively from baffles 9, 13 and 19. In some cases even these baffles 11, 16, 17 and 22 may be omitted, however this alternative is relatively less desirable in practice due to increase in pressure drop through the device due to gas turbulence. All of the scrubbed gas may be removed alternatively through either conduit 26 or 32. If all of the scrubbed gas is removed through conduit 26 as stream 27, then elements 28, 29, 30, 31 and 32 would be omitted. Elements 25 and 31 have been described as wire mesh filters or screens. These elements may alternatively consist of staggered wooden slats or strips, sieve trays, beds of packing, or the like. Additional or alternative spray nozzles similar to unit 8 may be disposed to spray scrubbing liquid horizontally or in a transverse angular direction into the gas stream. A plurality of scrubbing liquid inlet pipes 45 may also be disposed on the upper surface of element 20, and these inlet pipes will generally be oriented tangential to container 4. Scrubbing liquid admitted via pipes 45 will flow downwards in a circular flow path on the inner surface of baffle 19, for projection into the accelerated gas stream at the throat section of the outer annular venturi passage 44.

I claim:
1. An apparatus for scrubbing an impurity-laden gas stream with a liquid for impurity removal which comprises a vertically oriented cylindrical conduit, means to pass an impurity-laden gas stream downwards through said conduit, means for spraying a scrubbing liquid into said gas stream adjacent to the lower end of said conduit, a cylindrical gas scrubbing container, said container depending coaxially downwards from the lower end of said conduit and being provided with lower means for removal of impurity-laden scrubbing liquid, a central conical baffle, said central baffle being coaxially disposed within said container adjacent to the lower end of said conduit and below said liquid spray means, with the apex of said conical baffle extending upwards and opposed to the downwards flow of gas and liquid spray droplets, an annular horizontal circular baffle within said container, said annular baffle being concentrically and coaxially juxtaposed about the perimeter of said conical baffle, said annular baffle being spaced from said conical baffle, whereby a first circular annular passage for gas and spray liquid flow is defined between said conical baffle and said annular baffle, the upper surface of said annular baffle being defined by a triangular annular projection having an upper central apex, a horizontal inverted frustoconical baffle within said container means for directing liquid onto said frustoconical baffles inner surface, said inverted frustoconical baffle being concentrically and coaxially juxtaposed about the outer perimeter of said annular baffle and joined to said container, said inverted frustoconical baffle being spaced from said annular baffle, whereby a second circular annular passage for gas and spray liquid flow is defined between said annular baffle and said inverted frustoconical baffle, and means in said container downstream of said baffles to remove a scrubbed gas stream of reduced impurity content from said container.

2. The apparatus of claim 1, in which said means for spraying a scrubbing liquid into said gas stream is disposed within the lower end of said conduit.

3. The apparatus of claim 1, in which said means for spraying a scrubbing liquid into said gas stream consists of a plurality of spray nozzles, together with means to pass a scrubbing liquid stream to each of said spray nozzles.

4. The apparatus of claim 1, in which said conduit terminates with a lower end section within said container.

5. The apparatus of claim 1, in which the upper perimeter of said inverted frustoconical baffle is connected to said container by a fluid-impervious connection.

6. The apparatus of claim 1, in which said means to remove impurity-laden scrubbing liquid from the lower portion of said container comprises means to remove scrubbing liquid at a controlled rate, whereby a body of scrubbing liquid is maintained in the lower part of said container, said means including a liquid level sensitive element, said element being disposed within said container and serving to measure the level of liquid within the lower part of said container, a controller external to said container, means to transmit a signal proportional to liquid level from said element to said controller, a control valve, said control valve being disposed at a lower scrubbing liquid outlet from said container and serving to control scrubbing liquid flow rate through said outlet, and means to transmit a control signal from said controller to said control valve, whereby the flow rate of scrubbing liquid through said lower liquid outlet is regulated such that a body of scrubbing liquid containing impurity removed from said gas stream is continuously maintained within the lower portion of said container.

7. The apparatus of claim 1, combined with a first vertically oriented cylindrical baffle, said first cylindrical baffle depending downwards from the lower perimeter of said conical baffle, a second vertically oriented cylindrical baffle, said second cylindrical baffle depending downwards from the lower inner perimeter of the angular projection of said annular baffle, said second cylindrical baffle being concentric with and spaced opposite to said first cylindrical baffle, whereby said first and second cylindrical baffles define a vertical venturi throat section of said first annular passage, a third vertically oriented cylindrical baffle, said third cylindrical baffle depending downwards from the lower outer perimeter of the angular projection of said annular baffle, and a fourth vertically oriented cylindrical baffle, said fourth cylindrical baffle depending downwards from the lower perimeter of said inverted frustoconical baffle, said fourth cylindrical baffle being concentric with and spaced opposite to said third cylindrical baffle, whereby said third and fourth cylindrical baffles define a vertical venturi throat section of said second annular passage.

8. The apparatus of claim 7, in which a first inverted frustoconical baffle depends downwards from the lower perimeter of said first cylindrical baffle, a horizontal disc-shaped baffle extends across the opening defined by the lower perimeter of said first inverted frustoconical baffle, a first frustoconical baffle depends downwards from the lower perimeter of said second cylindrical baffle, a second inverted frustoconical baffle depends downwards from the lower perimeter of said third cylindrical baffle, a horizontal flat ring-shaped annular baffle extends across the annular opening defined by the lower perimeters of said first frustoconical baffle and said second inverted frustoconical baffle, and a second frustoconical baffle depends downwards from the lower perimeter of said fourth cylindrical baffle.

9. The apparatus of claim 1, in which a coaxial vertically oriented cylindrical conduit is provided within said container and below said baffles, whereby the mixture of scrubbed gas and impurity-laden liquid droplets discharged from said first and second circular annular passages flows downwards through said cylindrical conduit, said cylindrical conduit terminating above the lower end of said container, together with entrained liquid separator means disposed in the annular passage between said cylindrical conduit and said container to separate entrained liquid droplets from the scrubbed gas stream, said means to remove a scrubbed gas stream of reduced impurity content from said container extending from said container above said entrained liquid separator means.

10. The apparatus of claim 9, in which said entrained liquid separator means is a horizontal mesh filter.

11. An apparatus for scrubbing an impurity-laden gas stream with a liquid for impurity removal which comprises a first vertically oriented cylindrical conduit, means to pass an impurity-laden gas stream downwards through said first conduit, means for spraying a scrubbing liquid into said gas stream adjacent to the lower end of said conduit, a cylindrical gas scrubbing container, said container depending coaxially downwards from the lower end of said first conduit and being provided with lower means for removal of impurity-laden scrubbing liquid, a generally conical central baffle, said central baffle being coaxially disposed within said container adjacent to the lower end of said first conduit and below said liquid spray means, with the apex of said conical central baffle extending upwards and opposed to the downwards flow of gas and liquid spray droplets, said conical central baffle being provided with a vertical cylindrical section depending downwards from the upper conical portion of said central baffle and a lower inverted frustoconical section depending downwards from said cylindrical section, an annular horizontal circular baffle within said container, said annular baffle being concentrically and coaxially juxtaposed about the outer perimeter of said conical baffle, said annular baffle being spaced from said conical baffle, whereby a first circular annular passage for gas and spray liquid flow is defined between said conical central baffle and said annular baffle, the upper surface of said annular baffle being defined by a triangular annular projection having an upper central apex, a horizontal ring-shaped section having opposed inner and outer cylindrical surfaces and depending downwards from said angular projection, the inner cylindrical surface of said horizontal ring-shaped section being spaced opposite to the vertical cylindrical section of said conical central baffle, the lower section of said annular baffle being defined by an inner frustoconical surface and an outer inverted frustoconical surface, said lower section of said annular baffle depending downwards from said ring-shaped section, a horizontal inverted frustoconical baffle within said container means for directing liquid onto said frustoconical baffles inner surface, said inverted frustoconical baffle being joined to said container and concentrically and coaxially juxtaposed about the outer perimeter of said annular baffle and being provided with a lower vertical cylindrical section which depends downwards from the lower perimeter of said inverted frustoconical baffle and is spaced opposite to the outer cylindrical surface of said horizontal ring-shaped section of said annular baffle, said inverted frustoconical baffle and said dependent vertical cylindrical section being spaced from said annular baffle, whereby a second circular annular passage for gas and spray liquid flow is defined between said annular baffle and said inverted frustoconical baffle, an outer frustoconical baffle within said container, said frustoconical baffle depending downwards from the lower end of the vertical cylindrical section of said inverted frustoconical baffle, a second vertically oriented cylindrical conduit, said second conduit being coaxially disposed within said container and below said baffles, said second conduit depending downwards from said outer frustoconical baffle, whereby the mixture of scrubbed gas and impurity-laden liquid droplets discharged from said first and second circular annular passages flows downwards through said second conduit, said second conduit terminating above the lower end of said container, together with entrained liquid separator means disposed in the annular passage between said second conduit and said container to separate entrained liquid droplets from the scrubbed gas stream, and means extending from said container above said entrained liquid separator means and communicating therewith to remove a scrubbed gas stream of reduced impurity content from said container.

12. The apparatus of claim 11, in which said means for spraying a scrubbing liquid into said gas stream is disposed within the lower end of said first conduit.

13. The apparatus of claim 11, in which said means for spraying a scrubbing liquid into said gas stream consists of a plurality of spray nozzles, together with means to pass a scrubbing liquid stream to each of said spray nozzles.

14. The apparatus of claim 11, in which said first conduit terminates with a lower end section within said container.

15. The apparatus of claim 11, in which the upper perimeter of said inverted frustoconical baffle is connected to said container by a fluid-impervious connection.

16. The apparatus of claim 11, in which said entrained liquid separator means is a horizontal mesh filter.

17. The apparatus of claim 11, in which said means to remove impurity-laden scrubbing liquid from the lower portion of said container comprises means to remove scrubbing liquid at a controlled rate, whereby a body of scrubbing liquid is maintained in the lower part of said container, said means including a liquid level sensitive element, said element being disposed within said container and serving to measure the level of liquid within the lower part of said container, a controller external to said container, means to transmit a signal proportional to liquid level from said element to said controller, a control valve, said control valve being disposed at a lower scrubbing liquid outlet from said container and serving to control scrubbing liquid flow rate through said outlet, and means to transmit a control signal from said controller to said control valve, whereby the flow rate of scrubbing liquid through said lower liquid outlet is regulated such that a body of scrubbing liquid containing impurity removed from said gas stream is continuously maintained within the lower portion of said container.

18. The apparatus of claim 11, in which the upper apex of the angular projection of said annular baffle is spaced vertically at a lower elevation than the apex of said central conical baffle.